United States Patent [19]

Moneta

[11] Patent Number: 4,537,089
[45] Date of Patent: Aug. 27, 1985

[54] STEERING WHEEL

[75] Inventor: Casimir Moneta, Chicago, Ill.

[73] Assignee: J. I. Case Company, Racine, Wis.

[21] Appl. No.: 457,844

[22] Filed: Jan. 14, 1983

[51] Int. Cl.³ .............................................. B62D 1/18
[52] U.S. Cl. .................................. 74/493; 74/484 R; 280/775
[58] Field of Search ..................... 74/484 R, 493, 540, 74/104; 280/775; 44/7, 460

[56] References Cited

U.S. PATENT DOCUMENTS

| | | | |
|---|---|---|---|
| 2,988,931 | 6/1961 | Markley et al. | 74/493 X |
| 3,059,717 | 10/1962 | Moyer et al. | 180/79.2 |
| 3,198,030 | 8/1965 | Miller et al. | 280/775 X |
| 3,362,247 | 1/1968 | Watts | 74/493 |
| 3,395,930 | 8/1968 | Morgan | 74/493 X |
| 3,548,675 | 12/1970 | Crimes et al. | 74/493 |
| 3,556,550 | 1/1971 | Franchini | 74/493 X |
| 3,799,569 | 3/1974 | Baker | 74/493 X |
| 3,962,931 | 6/1976 | Moneta | 74/493 |
| 4,046,024 | 9/1977 | Broucksou | 74/493 |
| 4,464,933 | 8/1984 | Santis | 74/484 R X |

FOREIGN PATENT DOCUMENTS 3018247 11/1981 Fed. Rep. of Germany .... 74/484 R

OTHER PUBLICATIONS

*Ward's Auto World*, Nov. 1972, pp. 23 and 49, Jan Norbye, "Driver-Oriented Steering Wheel, Column Needed".

*Primary Examiner*—Allan D. Herrmann
*Assistant Examiner*—Joseph M. Rolnicki
*Attorney, Agent, or Firm*—Cullen, Sloman, Cantor, Grauer, Scott & Rutherford

[57] ABSTRACT

Reverse tilt steering wheel, i.e., the pivot point is not located down on the steering column below the wheel. The reverse tilt hereof is accomplished by concealed ramp track and track roller follower mechanism locating the pivot on the column axis, as and when extended, to a point located thereon which is above the wheel, to wit, projected completely without and beyond the structure. The resulting characteristic of the wheel is that it executes combined relative motion, coordinated so as to adjust in position along an arc concave with respect to the operator while simultaneously controlled in tilt to avoid change of wheel angularity from its normal position squarely facing the operator.

25 Claims, 8 Drawing Figures

FIG_3_

FIG_4_

Fig. 5

STEERING WHEEL

This application is a companion case to co-assigned Dean C. Santis Application Ser. No. 441,883 filed Nov. 15, 1982, the disclosure of which is incorporated in entirety herein by reference.

The invention relates to a reverse tilt steering wheel, i.e., the pivot point is not located down on the steering column below the wheel, which wheel is particularly adapted for adjustment to the individual operator to provide driving comfort for over-the-highway and off-highway tractors which the operator commonly drives continually over an extended stretch of time.

More particularly according to the practice in the past, it is easy to see that pivoting the column structure at the foot of the column will cause the wheel to tilt to new positions. The practice in so doing is therefore to force the wheel into unnatural and awkward attitudes in taking those new positions, each one at a changing and normally different wheel angularity offered to the driver. The unfulfilled need with the conventional, not so readily visualized, is to adjust the column into the more comfortable steering angle attitude desirable and yet keep the plane of the wheel at the same natural angularity squarely facing the driver in each of those adjusted attitudes of the steering column. Also not so readily visualized, is the unfulfilled need for the wheel displacement curve to be mechanically correlated with a natural curvilinear movement of a hand being swung at the extremity of an extended human arm as it pivots up and down.

In lieu of the just referred to conventional tilt action of the wheel and column which is in a direction from the lap of the operator up and away from him, the reverse tilt hereof is accomplished by concealed ramp track and track roller follower mechanism locating the pivot on the column axis, as and when extended, to a point located thereon which is above the wheel, to wit, projected completely without and beyond the structure.

As will be seen, a significant advantage of my invention comes from the characteristic that the wheel hereof executes combined relative motion, coordinated so as to adjust in position along an arc concave with respect to the operator while simultaneously controlled in tilt always to maintain the wheel angularity unchanged from its normal position squarely facing the operator. Other advantages, characteristics, features and objects will either be specifically pointed out or become apparent when, for a better understanding of my invention, reference is made to the following description taken in conjunction with the accompanying drawings which show certain preferred embodiments thereof and in which:

FIG. 6, in right side elevation, and FIG. 7 in top plan, are views which show an electronic modification of my invention and which correspond to, respectively, FIGS. 3 and 4 foregoing.

A preliminary word as to background is believed in order at this point, before we get into my specific figures of drawing. U.S. Pat. No. 4,046,024 discloses in FIG. 1 of the patent drawings the realities of a conventional tilt steering wheel. Theoretically, just the opposite to conventional practice is what is orthopedically natural and desirable as to angularity.

Figure 1:
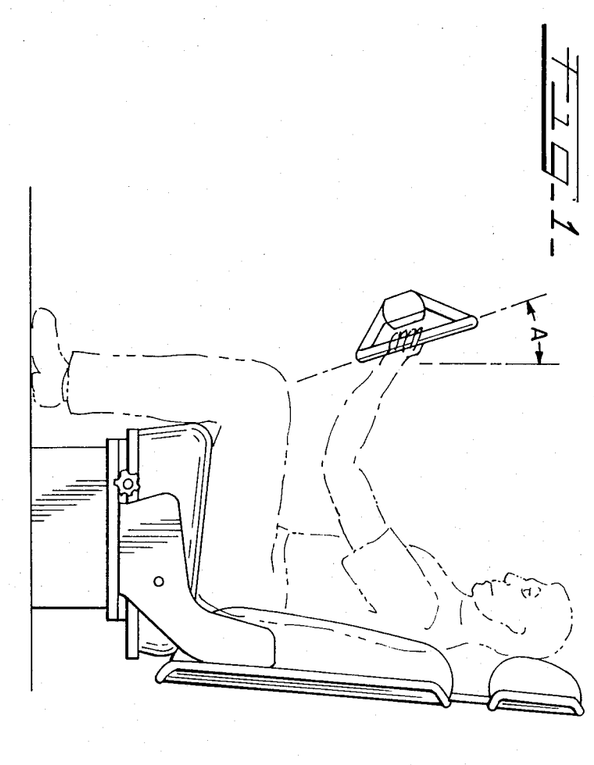
FIGS. 1 and 2 are schematics presented for comparison to show what my invention is about, in its underlying concept.

And as specifically applies to the latter point, FIG. 1 of the present drawings is illustrative of a high tilt wheel position which is seen to be more tolerable if the wheel angle A is close to vertical. The essentially vertical movement required of the operator's hands before him is what is natural, compared for example to the relative awkwardness of horizontal hand movement which can be readily visualized.

Figure 2:
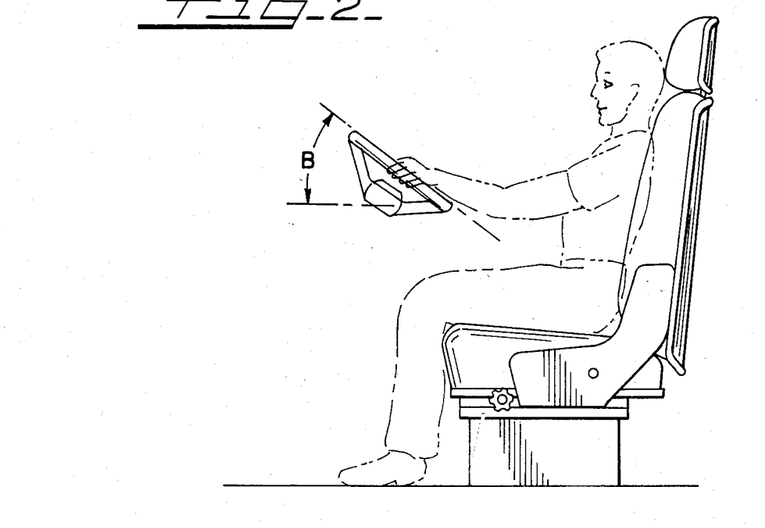

FIG. 2 is illustrative of a low tilt wheel position, seen to be more tolerable when close to an individual's lap if the wheel angle B is flat or thereabout so as to keep the wheel above and clear of the lap.

Figure 3:
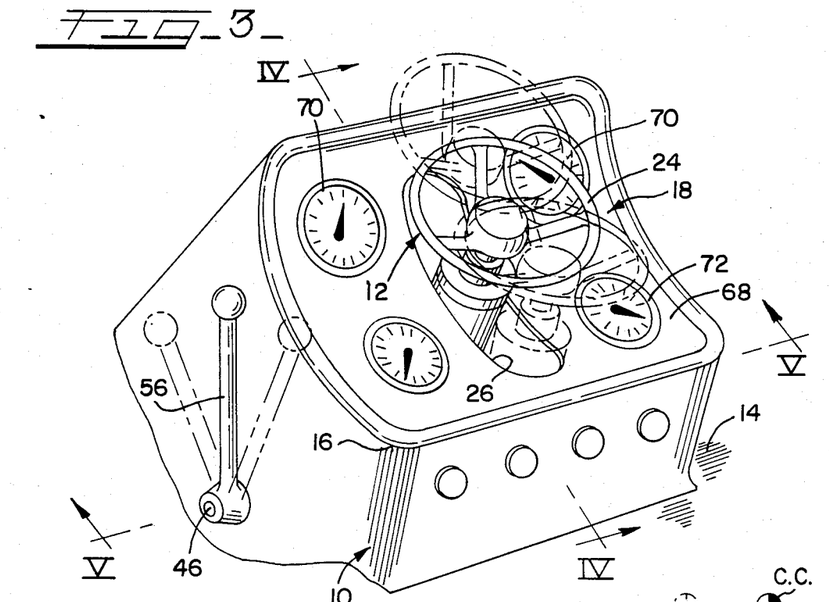
FIGS. 3 and 4 are left side perspective and elevational views respectively of a vehicle operator's station equipped with console and steering column structures embodying my reverse tilt wheel invention.
Figure 4:
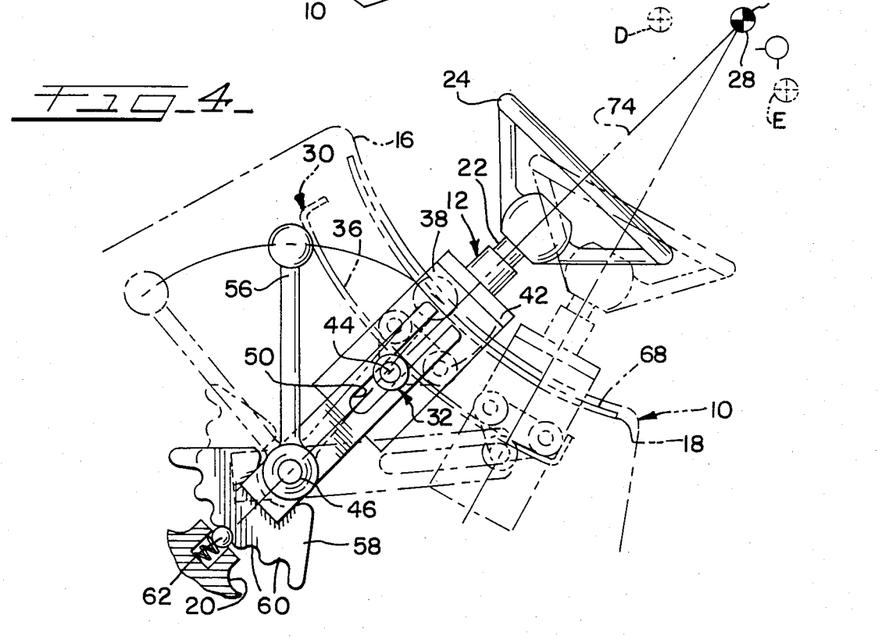
Figure 5:
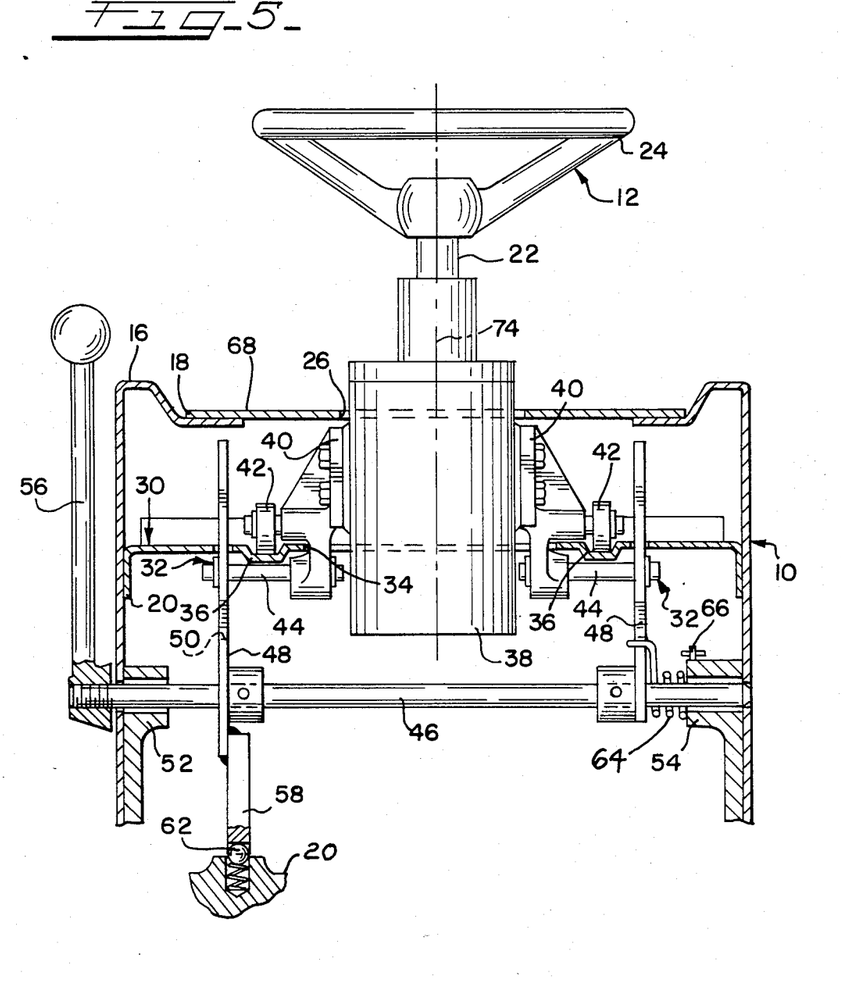
FIG. 5 is a longitudinal sectional view taken of the structures along the section line V—V appearing in FIG. 3.

In FIGS. 3, 4, and 5, console structure 10 and wheel and steering column structure 12 are shown arranged with the console structure 10 fixed for its support on a front floor 14 representative of a tractor cab and moveably supporting the wheel and column structure 12 to afford the reverse tilt steering wheel adjustment desired herein. The cab will be equipped appropriate to the particular vehicle on which it is to be used such as a farm tractor, tractor of a semi trailer truck, or other self-propelled vehicle.

The supporting structure 10 has a housing 16 which supports a cylindrically curved instrument panel 18 and which encloses and is supported by a rigid internal console framework 20. The supported structure 12 includes a protruding steering shaft 22 carrying in cantilever fashion at the upper end a splined-on deep dish steering wheel 24 of generally conical shape.

As a specific example of accomplishing the foregoing stated objective to make the wheel 24 execute two-way combined relative motion coordinated so as to adjust in position along an arc concave with respect to the operator while simultaneously controlled in tilt to avoid substantial change of wheel angularity from its normal position squarely facing the operator, the supported structure 12 in its restricted motion up and down within an instrument panel slot 26, guidingly carries the conical wheel 24 so as to correspond in movement therewith about an unshifting center of curvature 28 wholly external to the structures 10 and 12 and actually a horizontal fixed axis (FIG. 4). Or stated in astronomical terms in the interests of specificity, the conical wheel 24 executes part arc, synchronized rotation always about the center 28 the same as the dish of any satellite cone-shaped antenna does so as to avoid substantial change of angularity from its normal dish position squarely facing the earth.

For the foregoing purpose, the means of support of the console structure 10 for the steering column structure 12 comprises a guide ramp 30 fixedly carried by the framework 20 of supporting structure 10 and a cooperating group of engaging devices 32 carried by structure 12 in running engagement with the ramp 30, the tilt steering wheel 24 and curved instrument panel 18 in their various positions of relative movement to one another and also the ramp 30 all being tilted from the vertical away from the operator as figuratively appears in FIG. 4.

The specific movement traced out by the wheel 24 is determined purely by the geometry of the ramp 30. As actually illustrated in FIGS. 4 and 5, the ramp 30 is curved on the arc of a circle centered at 28, and includes a structure slot 34 (FIG. 5) corresponding to the instrument panel slot 26 and, adjacent each side edge of the structure slot 34, a depressed track 36. The track 36 at each side of the structure 12 has unnumbered sides, a radially inner face, and a radially outer face for establishing full cooperation with the engaging device 32 at that side.

Although omitted from the simplified showing of the drawings, I prefer for appearance sake to cover the foregoing mechanism by applying a convoluted, bellows type rubber boot fitting over the panel slot 26 and attached to the column structure 12.

A generally cylindrically shaped hand pump 38 at the foot of the column structure 12 carries at the opposite sides a bipartite carriage 40 (FIG. 5) bolted thereto which has rotatably mounted pairs of tandem tracking rollers 42 in running engagement with the radially inner surface of the tracks 36 and which carries a rotatably mounted pair of opposed hold down pins 44 included in the devices 32 and engaging the radially outer surfaces of the tracks 36. The sides of the depressed tracks 36 prevent the rollers as they follow one another from being laterally displaced. In other words the structure 12 stays on track confined in its movement strictly to a fore and aft vertical plane in the cab of the tractor. Carriage shafts carry the rollers 42 for freely turning on fixed axes.

The hand pump 38 in preferred form consists of a gerotor mechanism comprising an intermeshing pair of internally toothed and externally toothed gerotor members, one member of which upon initial rotation constrains the other to then orbit relative to the one member for positively displacing steering pump oil.

The hold down pins 44 not only hold the pairs of rollers 42 down on and in their tracks 36, but are the parts manipulated to control the roller position when stopped on the track. Toward that latter end, the console framework 20 carries an operator operated, horizontal rockshaft 46 including a pair of positioning arms 48 presenting slots 50 each adjacent a pin 44 and slideably receiving it to control the arcuate position thereof.

The rockshaft 46, provided with a fixed axis of support, is set in framework bearings 52 and 54 and projects at one end through and externally from the housing 16. That projecting end carries a keyed-on operator-operated tilt handle 56 so that, by rockshaft control, the leverage thus afforded the operator changes the tilt angle of wheel 24.

The positioning arm 48 on that end of the rockshaft which is associated with the bearing 52 and with the operator handle 56 carries a concentrically disposed detent sector 58 welded thereto and formed at the outer periphery with circumferentially aligned, equally spaced part detent sockets or notches 60 (FIG. 4). A fixed portion of the framework 20 opposite thereto carries a spring pressed ball detent 62 which the sector 58, as it rotates, cams out of the aligned notch 60 whereupon the detent 62 immediately occupies the oncoming notch indicative of a new angularity of the wheel 24. The occupied notch 60 at time of final adjustment of the wheel 24 firmly seats the detent 62 which retains that adjustment.

The positioning arm 48 fixed to the end of rockshaft 60 associated with the framework bearing 54 is engaged by a metal counterbalance spring 64 helically coiled about the shaft 46 and having an anchored end fixed against a stop 66 carried by the bearing 54. That arm 48 by its engagement with the adjacent hold down pin 44 is thus biased to suspend the structure 12 essentially weight free in its positioning up and down the ramp 30.

The curved instrument panel 18 conforms in proportional curvature to the ramp 30 so that the center of curvature 28 is common to both. The console face 68 on the radially inner surface of the instrument panel 18 includes the usual speed and time instruments 70 insert therein and various gauges, indicators and readouts 72.

As can be appreciated from the various broken line positions into which handle 56 and wheel 24 can be adjusted as shown in FIGS. 3 and 4, it amounts to a novel action for a tilt wheel 24 which during tilt adjustments takes positions superposed over corresponding adjacent portions of the console face 68 and which, during progressing adjustments, is constantly being reoriented in each progressive position so as to be brought into substantial parallelism with the corresponding adjacent console face portion over which it is then superposed.

While so shown that way in FIG. 4, it is not essential that the instrument panel 18 be shaped along the arc of a circle, or the ramp 30 be bent along the arc of a circle, or that the rollers 42, carriage 40, and wheel 24 execute their so-called synchronous rotation along the arc of a circle, all about a fixed horizontal central axis 28 in common.

If the concave curvature as shown in FIG. 4 is modified to follow various symmetrical curves of nonuniform radii such as the parabola, ellipse, hyperbola, catenary, or some symmetrical form of cycloid, the center of curvature will accordingly shift with the different positions such as to axis point D, or point E illustrated in phantom lines in FIG. 4. Thus, the horizontal axis containing that shifting center will be a shifting axis always falling upon the evolute curve defined by the locus of the instant centers of curvature.

If the curvilinear path has the asymmetric form of functions which include but are not limited to the tractrix, the center of curvature will again be a shifting one but always falling at a point along the longitudinal central axis 74 of the steering wheel and column structure 12.

If a portion or portions of the curvilinear path are made rectilinear as can be readily done, then obviously the center of curvature will be only a theoretical one located upward at infinity along the axis 74.

With limited exception, however, the center of curvature will fall along the shifting axis 74 at least approximately squarely in the upper area occupied by the operator, FIGS. 1, 2 and 4, and preferably slightly above his head.

In that way the wheel displacement curve will be mechanically correlated with a natural curvilinear movement of a human arm, with the wheel synchronized as it oscillates to keep its existing lined-up position with the center much the same as does a pendulum when it oscillates. That is, the pendulum inherently in all positions faces toward the center.

As will particularly adapt to a keyboard equipped modification of the wheel and column structure, telescoping shaft means can be provided in the column enabling wheel telescoping movement in and out of the column, as well as the previously described wheel tilting movement up and down with the column, and also the independent wheel rotation relative to the latter.

Figure 7:
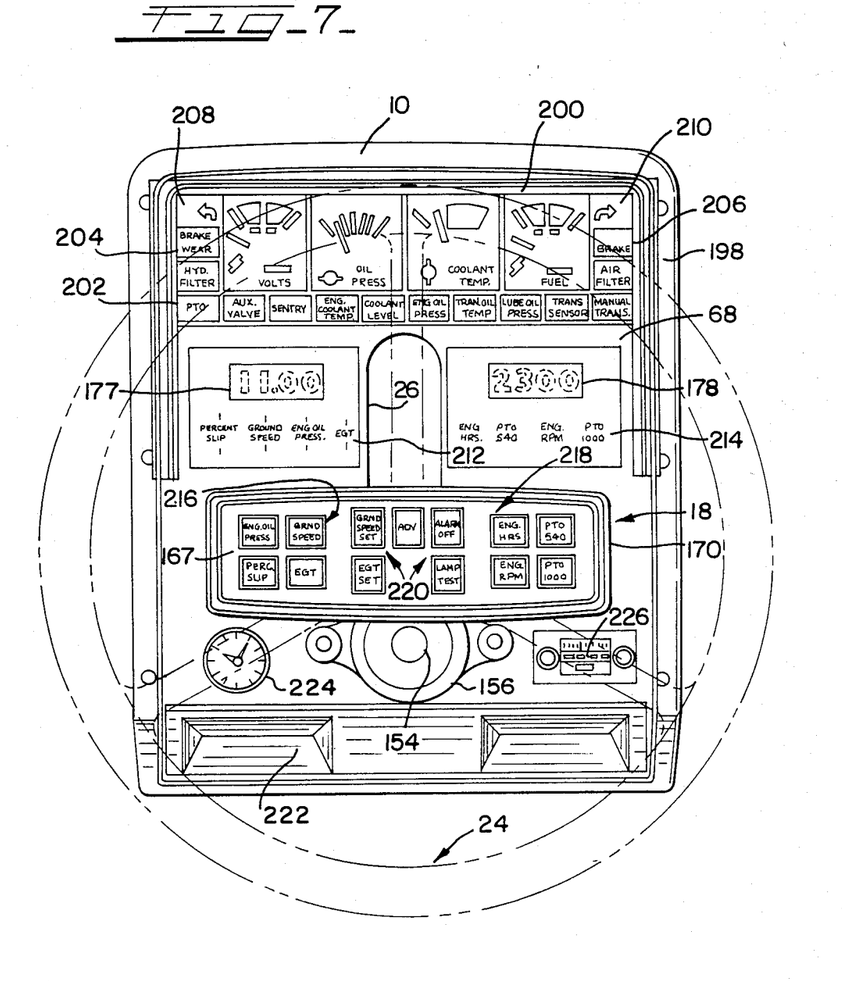
Figures 8, 9:
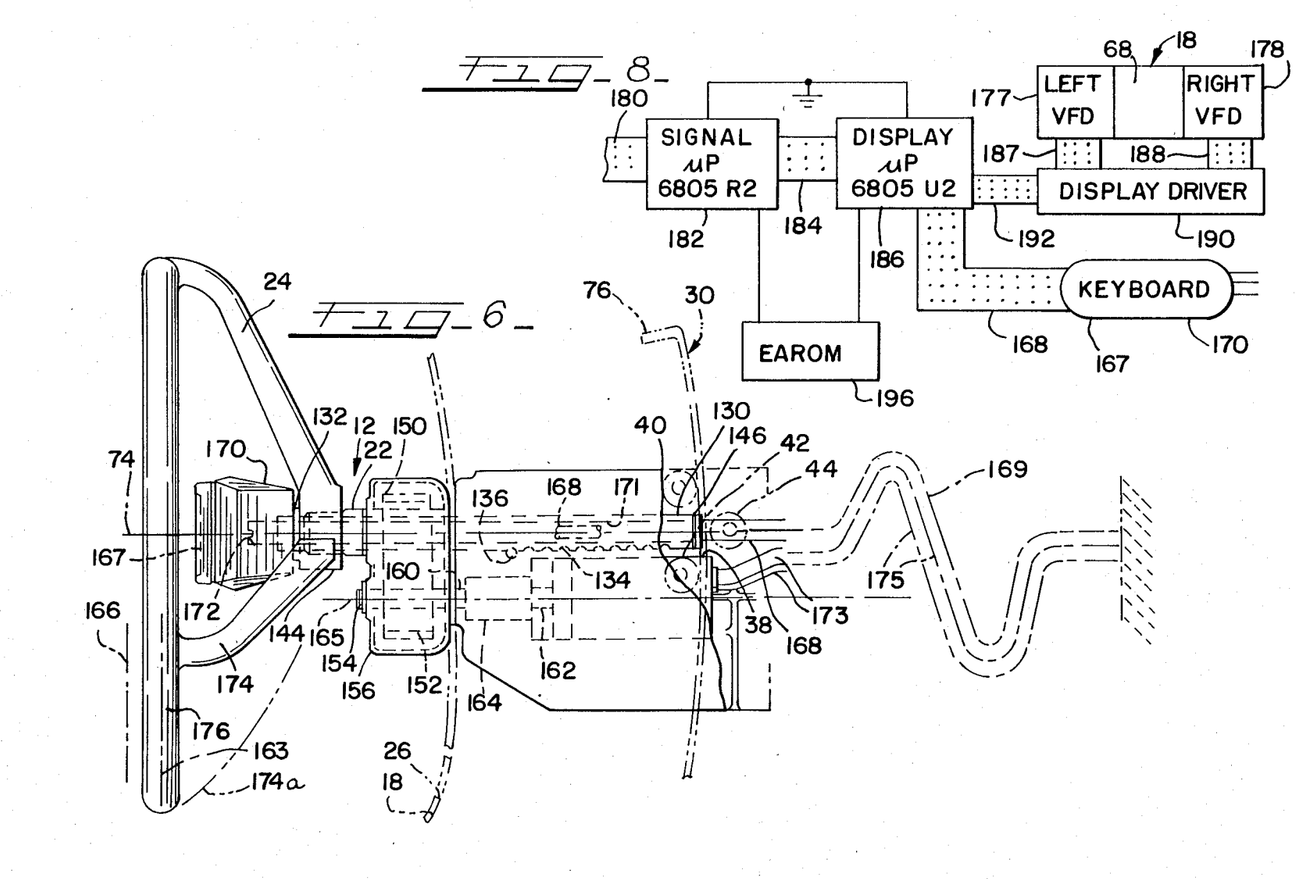
FIG. 8 is a showing of the schematic for the electronic modification.

MODIFICATION—FIGS. 6, 7 and 8

By way of an illustration of such, the modification includes a quill shaft 22 as shown in FIG. 6 which is turned by the wheel 24 of wheel and column structure 12. The environment of the console structure is only fragmentarily shown in phantom lines for these two particulars. First, the curved console instrument panel 18 has a steering column slot therein extending up and down with opposite ends, one of which is shown at the bottom of FIG. 6; the slot ends can if desired act as built-in stops to limit the up and down movement of the wheel and column structure 12.

Second, the ramp 30 fixed in the console structure has at the top and bottom inturned ends, one of which is shown at 76; those ends can afford the required stops if desired to limit the structure 12 movement up and down as it causes the column axis 74 correspondingly to tilt.

The structure 12 as so modified according to FIG. 6 has a four shaft arrangement including an upper pair of shafts which are one within another and which include an inner hollow telescoping spindle shaft 130. At the outer end of the spindle, a lock nut 132 limits the upward displacement of the conical steering wheel 24. The faced off bottom inner side of the spindle 130 has a plurality of longitudinally spaced apart transverse lock pin recesses 134 in the face. A lock pin 136 is slideably mounted for axial movement in the carriage frame 40 for engagement into any one of the recesses 134 as selected so that the spindle 130, slideably mounted in that same frame 40, can take axially fixed telescoped positions along the steering column longitudinal axis as indicated at 74.

The face with the recesses 134 engages a slideway, not shown, in frame 40 to prevent the spindle 130 from rotating as it slides, and the longitudinal sliding of the spindle 130 outwardly is limited by engagement of a retaining ring 146 at the spindle end against a frame shoulder, not shown.

The other one of the upper pair of shafts consists of the outer stub quill shaft 22 which at the upper end is internally splined to the hub 144 of the steering wheel 24, and which at the lower end integrally carries a drive pinion 150; the quill shaft 22 is journalled for rotation independently on a spindle shaft 130 and, because of nut 132, the shaft 22 partakes of joint sliding movement with the telescoping spindle shaft 130 of the pair (FIG. 6).

A driven gear 152 constantly meshing with the pinion 150 is splined to a telescopic steering shaft 154 adjacent the latter's outer end, which end is journalled in a gear housing 156. A long set of splines 160 is formed in the telescopic steering shaft inner end 162. The splines 160 internally engage a splined steering tube shaft 164 and, together, the shafts 154 and 164 respectively one within another constitute the lower pair of the four shaft arrangement hereof. The splines 160 enable the telescopic steering shaft 154 to slide to positions independently of the steering tube shaft 164 and yet to cause the latter tube shaft 164 to turn jointly with the telescopic steering shaft in all such positions. In turning either way, the latter shaft 164 correspondingly drives the reversible hand pump 38 which is fixed in the carriage frame 40.

A keyboard pod 170 centrally nested in the steering wheel 24 has a recess 172 receiving the outer end of the spindle shaft 130 which nonrotatably supports and is detachably fixed to the pod 170 (FIG. 6). In the deep dish construction of the steering wheel 24, the individual spokes 174 thereof are angled so as to rapidly diverge from the plane of the steering wheel rim 176 as they converge mutually toward the steering wheel hub 144. The conical path of rotation of such spokes as indicated at 174a and the path of revolution of the steering wheel rim 176 are such as to provide adequate clearance with the relatively nonrotatable instrument keyboard pod 170.

This generally bulbous keyboard pod 170 widens with increasing height, the lateral outer side portions flaring at a double angle of about 140° so as approximately to parallel the frusto conical angle of the spokes 174. The wheel 24 and the pod 170 retain a fixed relationship with all tilting of the column axis 74 and the corresponding tilting of the plane 163 of the wheel rim 176. So there is a constant angular correlation of the wheel and pod providing an unvarying view of both of them regardless of the steering column axis 74 of tilt. A column counterbalance spring, not shown, anchored to the console structure will cause the carriage frame 40 to pivot counterclockwise as viewed in FIG. 6 about its external pivot point, not shown, until the carriage reaches the top of ramp 30.

In the present four shaft arrangement, the sliding quill 22 and spindle 130 shafts of the upper pair, and the spliding telescopic steering shaft 154 within the steering tube shaft 164 of the lower pair have respective longitudinal axes 74 and 165 which, disposed parallel to one another, define a fixed vertical plane normal to the external horizontal pivot axis of structure 12 as referred to. So the column structure 12 and its supporting carriage frame 40 swing to their various tilted and locked positions in that vertical plane, irrespective and independent of the steering wheel's locked telescoped position by which it changes the plane 163 of the rim 176 into other selected normal telescoped planes such as the extended wheel plane 166.

In pod 170, a slightly inset switch keyboard panel 167 faces the operator and, while literally downwardly offset therefrom relative to the rim 176 so as to be completely confined with the boundaries of the wheel 24, nevertheless affords to the operator a finger touch to the keys or switch pads which is substantially equidistant to the finger grip portions of the rim 176 and falls essentially coplanar to the plane 163 of the latter. In other words, the hand motion of the operator is essentially lateral in transferring between rim and keyboard panel and back, altogether a minimal distance. The reason is that the wheel and keys of the pod mutually conform essentially to a common plane normal to the column structure 12.

While the bifurcate arms thereof (the near one appears in FIG. 6) support the pod's panel 167 somewhat depressed relative to the surrounding wheel rim 176, the panel materially adds to effective face area of the wheel 24 in distributing impact force for safety during a collision. The bifurcate-arm included-angle (dihedral) lends an angle of about 168° to the intersecting halves of the panel 167 to increase keyboard area and number of available switch pad locations.

A bundle or cable 168 of keyboard-connected multiple wires passes nontwistably down the hollow interior 171 of spindle shaft 130, exiting straight out the open lower end thereof so as to loop into a cable bight 169. Because as a group the switch-keyboard-connected portion of the multiple wire bundle 168, the upper pair of hollow shafts 22 and 130, the pod 170, and the steering wheel 24 are essentially concentric on the slanting slide axis 74, the interposed bight 169 readily accommodates sliding of the gear housing 156, column 12, and wheel 24 without chafing, kinking, or twisting.

In regard to turning, the steering wheel torque introduced by pinion 150 into gear 152, thence through the telescopic steering shaft splines 160 into the coaxial steering tube shaft 164, is transmitted into the hand pump 38. Such a hand pump is utilized in hydraulically steered tractors, and serves in lieu of other steering mechanisms such as direct linkage steering, hydraulic power steering, or power boost steering which are all optional offerings to the hand pump and motor controlled thereby. Such hand pump and motor can be of a modernized simplified form of the earlier pump operated steering system disclosed in Donald W. Moyer U.S. Pat. No. 3,059,717, the simplified form of which has only a single pair of pump service line hoses 173 trained into a flexible bight 175 fully to accommodate tilting of the axis 74 and the plane 163 of the steering wheel 24.

BLOCK DIAGRAM—FIG. 8

In the keyboard pod 170 shown in this figure, the purpose of its function analysis keys, not shown, in its keyboard panel 167 is primarily to select displays desired from the curved instrument panel 18 as will appear on the abbreviated console face appearing at 68. Included thereon is a left video fluorescent display 177 and a right video fluorescent display 178.

Vehicle functions processed for digital display on the foregoing are transmitted as conditioned electrical signals through an input cable 180 to a signal microprocessor chip 182 which constantly monitors all such functions originating about the vehicle. Another electrical cable 184 couples the signal chip 182 to a display microprocessor chip 186 programmed so that, as often as about once per second, the chip 186 senses the same single or the same several single functions and ignores for the time the other functions which are being continuously monitored.

So by operator selection through a cable 187 and a cable 188 to the respective displays 177 and 178 by way of display driver 190 and a coupling cable 192, the display chip 186 can provide a continuous display at 177 and at 178 of dual tractor functions re-sensed and updated as to currency every second. That selection is made by the keyboard panel 167 coupled to provide its input through the wire bundle or cable 168 into an appropriate section of the display chip 186. Further functions besides these dual digital functions will be elaborated upon when the full console face 68, rather than its abbreviated form here, is described in connection with the next figure of drawing to be discussed.

In one physically constructed embodiment of the invention, the signal chip 182 was a commercially procured microchip for computing designated 6805R2 and the counterpart display microchip 186 was designated 6805U2. Preferably, but not necessarily so, vacuum fluoresence was preferred for these dual digital displays 177 and 178.

An electrically alterable read only memory EAROM 196 interconnects the two microchip computers 182 and 186 so as to function as a nonvolatile memory therefor.

The necessary power supply for the foregoing is omitted for the sake of simplicity.

Transducers critically placed about the vehicle to provide appropriate electrical frequency signals to the input cable 180 can be selected from the group of a variable reluctance magnetic pickup, an optical pickup, and other magnetostrictive or other type pickups which provide a signal proportional, for example, to gear tooth frequency. The dual display construction can be selected from the group of a direct current electroluminescence display, liquid crystal display, cathode ray tube, and light emitting diode, in addition to the vacuum fluorescence display previously specified. The switch keyboard panel can have operators selected from the group of push button switches, touch sensitive switches, and forms of micro switches and other types in addition to the preferred switch pads, the latter comprising a known common sheet of slightly deflectible plastic having deposited metal contacts on the underside serving to complete a contact switch circuit. Conditioning circuits, not shown, necessary between the mentioned transducers and input cable 180 can be of several acceptable forms including wave shaping circuitry providing analog to digital converter action and flip flopping to divide the pulse frequency by two with greater resolution before passing on the pulse to the microcomputer chips.

The functional analysis keys and what they afford to the operator are now to be explained in detail.

CONSOLE AND ACTIVATING KEYBOARD—FIG. 7

As viewed by the operator according to this figure of drawing, the pod 170 presents the switch keyboard panel 167 in a handy proximal plane, whereas the curved face 68 of the instrument panel 18 occupies a relatively distal position which is not only concave but beyond the steering wheel 24, as shown in phantom lines, relative to the operator's eyes. In his sequence looking downwardly from the cab windshield, not shown, the operator's eyes will fall somewhere on the face 68 of the curved instrument panel 18, e.g., on the respective left and right dual digital displays 177 and 178, slightly below the top of the wheel 24, and next on the keyboard panel 167 slightly below the dual displays 177 and 178.

A plastic bezel trim 198 frames the console face 68. At the top of the frame, the console instrument cluster 200 takes the form of a horizontal line of gauges and meters. The next lower line 202 consists of tellites which show as red when illuminated so as to indicate specific tractor component failures. A columnar upward extension 204 of tellites and another upward extension 206 complete the tellites. Respectively thereabove, at left and right as viewed in FIG. 7 are the conventional symbols for the left and right flashing turn signal indicator lights 208 and 210.

A left horizontal line 212 of translucent annunciator indicia is located immediately below the left digital display 177 and is individually served by annunciator backlighting just beneath the panel 18. The medial-most indicia EGT of the line 212, when individually illuminated by its backlighting as mentioned, annunciates that the left digital display 177 is carrying an exhaust gas temperature reading.

A right horizontal line 214 of translucent annunciator indicia, each individually backlighted, is localized below the right digital display 178 so as to indicate which digital reading is being displayed, for example, the engine RPM function. Thus, when the engine RPM annunciator indicia are back-lighted at the same time as the ground speed indicia are back-lighted in the left line 212, the side-by-side digital readouts will be in terms of ground speed in the left display 177 for comparison simultaneously with the engine RPM digital reading of the right digital display 178 then acting as tachometer. Their current comparative values are of significance to the operator at times.

The particular digital display called for appearing as the reading at 177 is selected by means of the group of four switch pads 216 at the left end of the switch keyboard panel 167 as viewed in FIG. 7. It is similarly by finger touch selection in the right group of four switch pads 218 that the selection for the particular function readout is made for the right digital display 178.

The center of the panel 167 is relegated to a five switch pad group 220 by which various functions or limits are set through a selector switch appropriate thereto and through a switch pad ADV for changing to a proper setting for readouts from the left digital display 177.

Just above an escutcheon-like decoration 222 included at the bottom of trim 198, the console face 40 receives therein on the left the dial 224 of a clock and on the right a radio dial 226 for use for the operator in tuning a tractor radio housed in the console.

It is to be appreciated that the switch keyboard requiring the operator's careful scrutiny is proximally located at the head of the steering column practically face-to-face with the vehicle operator and always in facing attitude.

From the foregoing, it can now be appreciated that the hands and the associated showing, with each, of the broken line handgrip axis thereof as seen in FIGS. 1 and 2, tend to swing at the extremity of an extended human arm much as does a pendulum, always facing center. And even though the center of the present steering column and wheel structure provides therefor a completely external pivot point, the same analagous pendular motion mentioned is accomplished so as to be completely compatible with all adjusted positions taken by the human hand in tilting the wheel to the desired position from or toward the driver's lap, whichever is more comfortable.

Variations within the spirit and scope of the invention described are equally comprehended by the foregoing description.

What is claimed is:

1. Vehicle station (14), for an operator thereat, equipped with instrument console and steering column structures (10, 12) having respectively a console face distal to the operator and a tilt steering wheel relatively proximal to the operator, said console and column structures establishing cooperation to cantileverly support the proximal tilt wheel (24) for guided movement by the steering column structure (12) whereby the wheel executes two-way combined relative motion coordinated so as to adjust in position along a first arc concave with respect to the operator while simultaneously controlled in tilt to avoid substantial change of wheel angularity from its normal position squarely facing the operator, and a face slot (26) formed in the console face in receiving relation to, and defining a path for, the steering column structure to accommodate motion of the steering column structure in the instrument console structure by a tracking movement to, and transversely of, the console face of the latter, said face slot and said console face of the instrument console structure being curved on an arc similar to the first arc so as to be likewise concave with respect to the operator.

2. The invention as set forth in claim 1 characterized by:
   said wheel nesting therein a companion keyboard pod (170) carried by the column structure (12), effectively presenting to the operator functional analysis keys connected to the console structure (10) to activate at least one electrical component provided in the console face as selected from devices consisting of a tellite device and a digital readout display device.

3. The invention as set forth in claim 2 further characterized whereby:
   said wheel and keys of the pod so carried as to maintain with respect to the operator both identical angularity to one another and relative rotatability between one another, in all tilt positions of the wheel and companion pod.

4. The invention as set forth in claim 3 additionally characterized by:
   said wheel and keys of the pod mutually conforming essentially to a common plane normal to the column structure (12).

5. The invention as set forth in claim 1 characterized by the steering column structure (12) guiding the tilt wheel along the arc (36) of a circle as it tilts.

6. The invention as set forth in claim 1 characterized by the tilt wheel arc of movement having a center of curvature located (D) (E) at least approximately at a point high on the operator.

7. The invention as set forth in claim 6, geometrically characterized by said center of curvature having in radial alignment therewith the longitudinal axis (74) of the steering column structure (12) in all its positions guiding the arcuate movement of the tilt wheel.

8. The invention as set forth in claim 6, further characterized by the center of curvature actually comprising a horizontal axis and said tilt wheel arc of movement defining a generally curvilinear path.

9. The invention as set forth in claim 8 additionally characterized by the horizontal axis defining a shifting center for a plane curve with a nonuniform radius of curvature.

10. The invention as set forth in claim 8 additionally characterized by the horizontal axis being stationary so as accordingly to define a center for said curvilinear path fixed at least approximately at said point high on the operator.

11. The invention as set forth in claim 8 additionally characterized wherein the distal console face (68) has a substantially cylindrical curvature about a horizontal axis at least approximating the horizontal axis of the wheel's aforesaid curvilinear path.

12. Vehicle station (14), for an operator thereat, equipped with a supported steering column structure (12) and an instrument console structure (10) having means of support for the steering column structure, said structures having respectively a console face distal to the operator and a tilt steering wheel relatively proximal to the operator;
   said means of support of the console structure (10) for the steering column structure (12) comprising a curved guide ramp (30) carried by one of the structures and engaging devices (32) in running engagement with the ramp and said engaging devices being carried by the other of said structures, whereby the column structure (12) is supported by the console structure (10) for generally up and down guided movement thereon and for cantileverly supporting the tilt wheel for corresponding guided movement;

said tilt steering wheel and console face in their various positions of relative movement to one another and also said ramp all being tilted from the vertical away from the operator.

13. The invention as set forth in claim 12 characterized by:

said steering column structure (12) cantileverly supporting the tilt wheel for guided movement in an arc concave with respect to the operator and the ramp (30) correspondingly having a shape bent according to a similar arc concave with respect to the operator.

14. The invention as set forth in claim 13 further characterized by:

the tilt wheel arc of movement having a center of curvature located (D) (E) at least approximately adjacent the operator.

15. The invention as set forth in claim 14 additionally characterized by the tilt wheel arc center of curvature comprising a horizontal axis and said tilt wheel arc of movement defining a generally curvilinear path.

16. The invention as set forth in claim 12 characterized by:

said ramp defining a depressed track (30);

said engaging devices comprising rollers (42) with means (44) holding the rollers in the depressed track of the ramp.

17. The invention as set forth in claim 12 characterized whereby:

said ramp (30) carried by the console structure (10) in a fixed tilted position thereon;

said engaging devices carried by the column structure (12) so as to run on fixed axes relative thereto.

18. The invention as set forth in claim 17 further characterized by:

means of adjustment comprising an arm-carrying rockshaft (46) having a fixed axis of support in the console structure (10), having a first arm (56) connected thereto forming an operator's handle to adjust the wheel tilt, and having a second arm (48) connected thereto and to the column structure (12) to thereby set the wheel tilt angle.

19. Vehicle station (14), for an operator thereat, equipped with console and column structures (10, 12) having respectively an instrument console (68) distal to the operator and a keyboard pod (170) relatively proximal to the operator, said console and column structures (10, 14) establishing cooperation to cantileverly support the proximal keyboard pod (170) for guided movement by the column structure (12) whereby the pod executes two-way combined motion coordinated so as to adjust in position along a first arc concave with respect to the operator while simultaneously controlled in tilt so as to avoid substantial change of pod angularity from its normal position squarely facing the operator, and a face slot (26) formed in the console face in receiving relation to, and defining a path for, the column structure to accommodate the motion of the column structure in the console structure by a tracking movement to, and transversely of, the console face, said face slot and said console face of the console structure being curved on an arc similar to the first arc so as to be likewise concave with respect to the operator.

20. The invention as set forth in claim 19 characterized by:

the pod concave arc of movement having a center of curvature comprising a horizontal axis and defining a generally curvilinear path.

21. The invention as set forth in claim 20 further characterized by:

said distal console including a console face frame presenting therewithin an instrument panel (18) having a substantially cylindrical curvature about a horizontal axis at least approximating the horizontal axis of the pod's aforesaid curvilinear path;

said proximal pod presenting a keyboard panel which during adjustment of the relatively proximal pod takes positions superposed over corresponding adjacent portions of the instrument panel of the relatively distal console and which, during progressive adjustments, is constantly being reoriented in each progressive position so as to be brought into substantial parallelism with the corresponding adjacent instrument panel portion over which it is then superimposed.

22. The invention as set forth in claim 21, further characterized by:

a relatively rotatable steering wheel;

said keyboard pod nesting therewithin, being fixedly carried by the column structure (12), and effectively presenting to the operator functional analysis keys connected to said instrument panel of the relatively distal console to activate at least one electrical component provided in the panel as selected from devices consisting of a tellite device and a digital readout display device.

23. Vehicle station (14), for an operator thereat, equipped with tilt wheel column structure and a longitudinally slotted console face structure distal to the operator, said tilt wheel column structure (12) operatively related to the face structure (10) within the face slot (26) and constrained by means providing for equivalent movement consistent with the longitudinal face slot and having a tilt steering wheel (24) relatively proximal to the operator, said console face structure and its longitudinal slot having an appreciably curved contour concave with respect to the operator and said slot comprising an approximately bottom to top curvilinear face slot, and means (20) supporting the console face structure (10) and tilt wheel column structure (12) in the operative relationship described.

24. Vehicle station (14), for an operator thereat, equipped with longitudinally slotted console face structure (10) distal to the operator and relatively proximal telescoping shaft (130) and column (12) structure operatively related therewith in the face slot and constrained by means providing for equivalent movement consistent with the longitudinal face slot (26), said console face structure and its longitudinal slot having an appreciably curved contour concave with respect to the operator and said slot comprising an approximately bottom to top curvilinear face slot, means (20) supporting the longitudinally slotted console face structure and telescoping shaft and column structure in the operative relationship described and with the telescoping shaft (130) further telescopically related to the longitudinal slot operatively, and a wheel (24) for the operator to steer the vehicle, said telescoping shaft having means (22) thereon supporting the wheel for wheel tilting movement up and down therewith, for wheel telescoping movement in and out therewith, and for independent rotation relative thereto.

25. At a vehicle operator's station, in combination:
a console structure, and a tilt wheel column structure positioned in and connected to the console structure for relative tilting with respect thereto; and
a leverage handle drive effective forcibly to adjust, from set tilt angle positions, the tilt wheel column structure relative to said console structure, and comprising an arm-carrying rockshaft, said rockshaft having a fixed axis of support in the console structure, having a first arm connected thereto forming an operator's tilt handle to adjust the wheel column structure tilt, and having a second arm connected between the rockshaft and wheel column structure to thereby set the tilt angle position of the latter.

* * * * *